July 6, 1948.  R. A. MANK  2,444,573
TIRE CHAIN
Filed May 28, 1946

INVENTOR
Raymond A. Mank
BY
William B. Jaspert
ATTORNEY

Patented July 6, 1948

2,444,573

UNITED STATES PATENT OFFICE 2,444,573

TIRE CHAIN

Raymond A. Mank, Pittsburgh, Pa.

Application May 28, 1946, Serial No. 672,807

3 Claims. (Cl. 152—242)

This invention relates to new and useful improvements in tire chains, and it is among the objects thereof to provide a composite rubber and steel side rim of such cross-sectional thickness and rigidity to constitute self-sustaining rim-like members for spacing and anchoring the cross links whereby to facilitate the mounting of the tire chain on the wheel.

It is a further object of the invention to provide a tire chain of the above designated character in which a flexible cable is embedded in a resilient rubber rim to allow for distribution of stresses over wide areas of the cross link supports.

Still another object of the invention is to provide a tire chain having rubber rims with flexible steel cables embedded therein having eyelets for connection of the cross links projecting from the rubber element.

Figure 1:
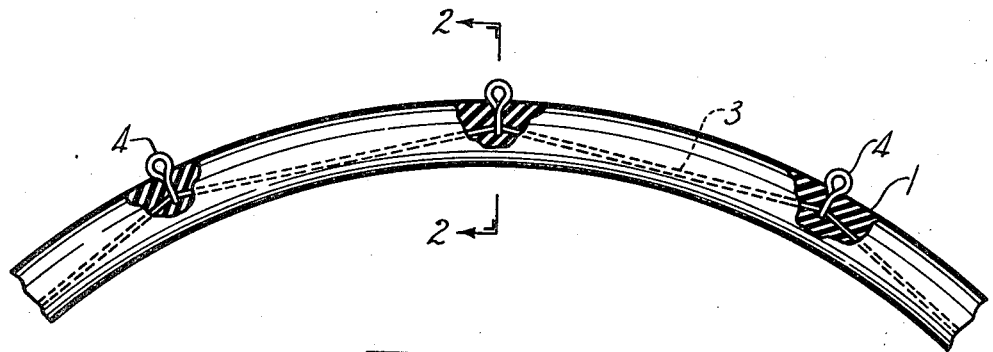
Figure 4:
Figure 2:
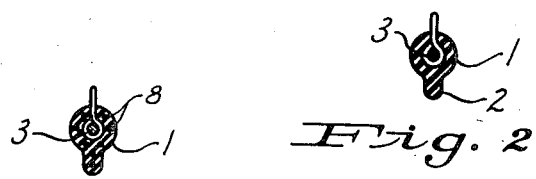
Figure 3:
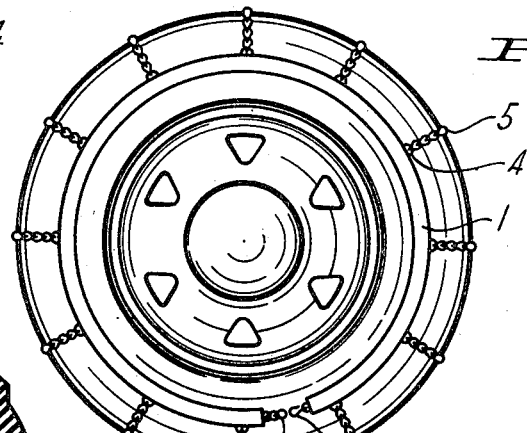
Figure 6:
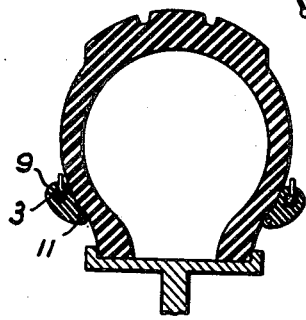

These and other objects of the invention will become more apparent from a consideration of the accompanying drawing constituting a part hereof, in which like reference characters designate like parts, and in which Fig. 1 is a side elevational view, partially in cross section, of a portion of a tire chain support embodying the principles of this invention;

Fig. 2 a cross-sectional view taken along the line 2—2, Fig. 1;

Fig. 3 a side elevational view of a complete tire chain mounted on a vehicle wheel;

Fig. 4 a cross-sectional view of a modified form of side rim; and

Figure 5:

Fig. 5 a cross-sectional view of still another form of side rim.

With reference to the several figures of the drawing, the structure therein illustrated comprises a rib-like rubber rim 1 having the rib 2 extending radially inward in the direction of the hub of the wheel, the section being of a design to employ a minimum amount of rubber while providing for maximum stiffness in a radial direction so that it can be handled as a self-sustaining rim or split hoop in mounting on the wheel of a vehicle. For this purpose other sections than that shown in Fig. 2 may be employed.

Embedded in the rubber element 1 is a flexible steel cable 3 which, as shown in dotted lines in Fig. 1, forms chords of arcs in the rubber side member. Connected to the flexible cable 3 are eyelets 4 for anchoring cross links 5, the cable 3 passing through loops of the eyelets 4.

The cable ends are provided with links 6 and hooks 7 which may be of the conventional chain fastening type to secure the ends of the rubber rims and cables when the chain is mounted on the wheel as shown in Fig. 3.

In mounting the chain on the wheel one of the rubber side rims is slipped over the top of the wheel in a manner apparent to anyone having experience with tire chains, and because of the rigidity of the resilient rubber elements all of the cross links are maintained in their proper position of spacing so that the chain will substantially fit the wheel without the necessity for stretching or adjusting as is needed in the use of the side link type tire chains. The wheel need not be jacked up for this purpose, and when the chain is applied the car can be moved to bring the link ends 6 and 7 to the proper accessible position for anchoring or fastening the same.

As shown in Fig. 4 the rubber side rims may have reenforcing wire or fabric 8 molded therein.

In Fig. 5 the side rim 9 is shaped to engage the side of the tire over a large area, the side 10 being somewhat concave for this purpose. A stiffening insert 11 may be employed as shown in Fig. 5, but such may also be used in the form of side rim shown in Figs. 2 and 4.

It will be seen from the structural features of the side rims with the flexible cable mounted therein and the permanently located cross link eyelets that the peripheral spacing of the cross links is always maintained and the semi-rigidity of the rubber element aids in the placement of the chain on the tire of the wheel. The cable permits distribution of the stress on the cross links. Instead of the steel cable 3, a chain or hoop-like member can be employed and other means for providing for the attachment of the cross links than by the embedded eyelets may be employed to effect a direct connection of the cross links with the embedded side supporting members.

Although one embodiment of the invention has been herein illustrated and described, it will be evident to those skilled in the art that various modifications may be made in the details of construction without departing from the principles herein set forth.

I claim:

1. A composite tire chain structure comprising a plurality of rubber side rims having a flexible cable mounted therein, cross link anchorages mounted in the side rims and secured to said flexible cable, said side rims being split members and having fastening means connected to the ends of the cable extending from the ends of the rims.

2. A composite tire chain comprising rubber side rims of a structural cross sectional shape to lend rigidity to the rims in a radial direction, said rims being split, a continuous metal anchorage member extending the full length of the side rims embedded and mounted in said rims, anchorages for cross links mounted in said side rims and connected to said anchorage members, cross links extending across said side rims, and fastening means at the split end of the rims for joining the rims when the tire chain is mounted on a wheel.

3. In a tire chain structure, a self-sustaining molded rubber side rim having reenforcing embedded therein, and means for fastening cross chains to said rim consisting of anchorages for receiving the end link of the cross chains mounted in angularly spaced relation on said side rim.

RAYMOND A. MANK.

REFERENCES CITED

The following references are of record in the file of this patent:

UNITED STATES PATENTS

| Number | Name | Date |
|---|---|---|
| 1,025,159 | Raymond | May 7, 1912 |
| 1,311,971 | Johnson | Aug. 5, 1919 |
| 1,595,339 | Brittain | Aug. 10, 1926 |